(12) United States Patent
Maehara et al.

(10) Patent No.: US 7,178,643 B2
(45) Date of Patent: Feb. 20, 2007

(54) DRUM BRAKE APPARATUS

(75) Inventors: Toshifumi Maehara, Tokyo (JP);
Katsuhiro Miyata, Tokyo (JP);
Yukimasa Mitsude, Tokyo (JP);
Takayuki Mukasa, Tokyo (JP);
Takeshi Noda, Tokyo (JP); Yoshiaki Saitoh, Tokyo (JP)

(73) Assignee: Akebono Brake Endustry Co., Ltd., Tokyo (JP)

( * ) Notice: Subject to any disclaimer, the term of this patent is extended or adjusted under 35 U.S.C. 154(b) by 0 days.

(21) Appl. No.: 10/858,283

(22) Filed: Jun. 2, 2004

(65) Prior Publication Data
US 2004/0245059 A1   Dec. 9, 2004

(30) Foreign Application Priority Data
Jun. 3, 2003   (JP) ................. P.2003-158322

(51) Int. Cl.
*F16D 65/09* (2006.01)
(52) U.S. Cl. .............. 188/79.63; 188/325; 188/329
(58) Field of Classification Search ............. 188/78, 188/325, 329, 332, 79.63
See application file for complete search history.

(56) References Cited
U.S. PATENT DOCUMENTS 1,792,432 A * 2/1931 Lauer ................ 188/332
1,799,227 A * 4/1931 Gunn ................. 188/332
1,908,439 A * 5/1933 Norton ............... 188/332
1,994,820 A * 3/1935 Herve ................ 188/332
5,310,028 A * 5/1994 Sampson ............. 188/329
2001/0020561 A1 * 9/2001 Maehara ............. 188/74
2002/0166742 A1   11/2002 Maehara

FOREIGN PATENT DOCUMENTS

| JP | 2001-254766 | 9/2001 |
| JP | 2002-54665 | 2/2002 |
| JP | A-2002-33044 | 11/2002 |

* cited by examiner

*Primary Examiner*—James McClellan
*Assistant Examiner*—Bradley King
(74) *Attorney, Agent, or Firm*—Morgan, Lewis & Bockius, LLP

(57) ABSTRACT

A cam mechanism 7 provided as a shoe drive mechanism includes a cam supporting plate 21 being loosely and rotatably fitted on an anchor pin 10 for receiving a shoe operating force, a first cam plate 23 rotatably connected to the cam supporting plate 21 at an outer cam supporting position which is a position shifted away from the anchor pin 10 radially outwardly of the drum, a second cam plate 25 rotatably connected to the cam supporting plate 21 at an inner cam supporting position which is away from the anchor pin 10 toward an operating force generator 6, so that a pair of brake shoes 3, 4 are opened outwardly by the separate cam plates 23, 25, respectively.

11 Claims, 12 Drawing Sheets

DRUM BRAKE APPARATUS

BACKGROUND OF THE INVENTION

The present invention relates to a drum brake apparatus in which a highly effective and stable braking can be secured by controlling a pressing force of a brake shoe against a drum according to a brake power. More specifically, an improvement for realizing downsizing of operating force generating means or improvement of responsiveness of a braking action by reducing displacement in output from the operating force generating means.

In the related art, various types of drum brake apparatuses in various forms are employed for braking the traveling of a vehicle. These drum brake apparatuses are classified into leading-trailing type, two-leading type, or a duo-servo type depending on the arrangement of brake shoes to be pressed against the inner peripheral surface of a substantially cylindrical drum.

The duo-servo type drum brake apparatus is generally provided with a pair of brake shoes including a primary shoe and a secondary shoe disposed in a cylindrical drum so as to oppose to each other.

The primary shoe has a power input section on the entrance side of the drum in the direction of forward rotation, and the exit side of the drum in the direction of forward rotation is connected to the entrance side of the secondary shoe, for example, via an adjuster. On the other hand, the exit side of the secondary shoe is brought into abutment with an anchor unit provided on a backing plate so that a brake power (braking torque) applied on the primary shoe and the secondary shoe is received by the anchor unit.

Accordingly, when the primary shoe and the secondary shoe are opened outward and pressed against the inner peripheral surface of the drum, the brake power acting on the primary shoe is transmitted to the entrance side of the secondary shoe and acts to press the secondary shoe against the inner peripheral surface of the drum. Therefore, a self-servo effect is generated both on the primary shoe and the secondary shoe, so that a braking force with a fairly high gain is obtained.

The duo-servo type drum brake apparatus described above has a number of advantages in comparison with the drum brake apparatuses of leading-trailing type or two-leading type, not only in that a fairly high braking force can be obtained, but also in that it can easily be downsized and a parking brake can easily be assembled.

However, since the duo-servo type drum brake apparatus as described above is sensitive to variation in coefficient of friction of a lining of the brake shoe, there is a tendency that the braking force can hardly be stabilized, and hence there is a requirement for a device to stabilize the braking force.

In addition, electrification of the brake apparatus is also an important subject for the brake apparatus for a vehicle in these days in order to adapt it to intelligent braking function including an anti-lock braking system or to an electric vehicle (EV) suitable for reducing environmental contamination.

In view of such backgrounds, as a shoe drive mechanism for opening a pair of brake shoes outward during braking period, the present applicant has already proposed a cam mechanism for opening the pair of brake shoes outward and presses the same against the drum depending on a shoe operating force transmitted to an input power receiving portion from operating force generating means when putting a service brake on, and allowing a brake limiting force acting in the direction of reducing the effect of the shoe operating force when the brake power acting on an anchor pin during braking period reaches a predetermined magnification with respect to the shoe operating force (For example, JP-A-2002-333044).

By using the cam mechanism of JP-A-2002-333044, the braking force in the duo-servo type drum brake apparatus was stabilized and, in addition, electrification of the brake apparatus could easily be realized only by employing the electric operating force generating means utilizing an electric motor as an operating force generating means instead of a liquid pressure wheel cylinder in the related art.

However, the cam mechanism as the shoe drive mechanism in the related art as described above includes an input pin for receiving the shoe operating force from the operating force generating means, and a primary anchor pin and a secondary anchor pin which come into abutment with the ends of the respective brake shoes are provided on a cam plate, which is rotatably provided on a main anchor pin fixed to the backing plate, so that the brake shoes are opened outward by the rotation of the cam plate about the main anchor pin according to the shoe operating force. Therefore, the distance from the input pin to the main anchor pin is relatively large in comparison with the distance from the main anchor pin to the primary anchor pin or the distance from the main anchor pin to the secondary anchor pin.

In order to set a lever ratio on the cam plate, displacement transmitted to the cam plate by the operating force generating means is reduced and transmitted to the respective brake shoes, and hence the operating force generating means is required to be capable of outputting a large displacement. Therefore, when a liquid-pressure piston or the like is used as the operating force generating means, there is a possibility to cause problems such as upsizing of the operating force generating means or lowering of the responsiveness of the braking action due to increase in the amount of used liquid in the initial stage of braking.

SUMMARY OF THE INVENTION

In view of such problems described above, it is an object of the present invention to provide a drum brake apparatus in which a braking force can be controlled according to a brake power, the brake takes effect stably, and displacement fed from an operating force generating means in the initial stage of braking can be multiplied and outputted, whereby downsizing of the operating force generating means and improvement of responsiveness of a braking action are achieved.

In order to achieve the object described above, the present invention provides a drum brake apparatus comprising: a first and a second brake shoes disposed in a drum to oppose to each other; and a cam mechanism for generating a braking force by opening the first and second brake shoes outward according to a shoe operating force generated by operating force generator, and for controlling the braking force by utilizing a reaction force exerted from the brake shoes during braking period, wherein the cam mechanism includes: a cam supporting plate, loosely and rotatably fitted on an anchor pin projecting upright on a backing plate, and having an input power receiving portion for receiving the shoe operating force at a position radially inwardly of the drum with respect to the anchor pin; a first cam plate, rotatably connected to the cam supporting plate at an outer cam supporting position which is located radially outwardly of the drum with respect to the anchor pin, and having a first shoe receiving arcuate portion which comes into abutment with an end of one of the brake shoes; and a second cam plate, rotatably connected to the cam supporting plate at an inner the cam supporting position which is the mid point between the anchor pin and the input power receiving portion, and having a second shoe receiving arcuate portion which comes into abutment with the end of the other brake shoe, and wherein, until a shoe clearance is eliminated, the cam supporting plate rotates about one of cam supporting positions of one of the cam plates which receives the brake power, to open the brake shoe being in abutment with the other of cam plates, and after the shoe clearance is eliminated, the cam supporting plate rotates about the anchor pin to press the first and the second brake shoes against the drum.

According to the drum brake apparatus thus configured, when the braking operation is initiated and the shoe operating force is fed to the input power receiving portion of the cam supporting plate from the operating force generator, the cam supporting plate starts rotation by the shoe operating force and then the braking operation is initiated.

The cam supporting plate, being loosely and rotatably fitted on the anchor pin, rotates about the cam supporting position on the cam plate, which receives the brake power, and opens the brake shoe which is in abutment with the other cam plate outward in the initial stage of braking until the shoe clearance is eliminated, and rotates about the anchor pin and presses the pair of brake shoes to which the respective cam plates are in abutment against the drum, thereby generating the braking force after the shoe clearance is eliminated.

When the brake is put on, the brake power applied to the shoe receiving arcuate portion on one of the cam plates acts in the direction to reduce the amount of rotation of the cam supporting plate about the anchor pin to control the braking force so as not to exceed the predetermined magnification.

In the initial stage of braking until the shoe clearance is eliminated when braking during forward travel, the cam supporting plate rotates about the inner cam supporting position which is a position shifted from the anchor pin toward the operating force generator. Therefore, the radius of rotation of the shoe receiving arcuate portion which presses one of the brake shoes increases, in comparison with the braking behavior after the shoe clearance is eliminated (that is, the behavior of the cam supporting plate to rotate about the anchor pin for opening the brake shoes outward), and hence the shoe receiving arcuate portion is displaced significantly with respect to the slight rotation of the cam supporting plate.

In other words, the cam supporting plate can magnify the displacement fed from the operating force generator and output the same by the rotation about the inner cam supporting position which is the position shifted from the anchor pin toward the operating force generator in the initial stage of braking and by the rotation about the anchor pin in the mid and later stage of braking. Therefore, even when the amount of displacement that the operating force generator applies to the input power receiving portion of the cam supporting plate is small, a significant displacement can be secured at the shoe receiving arcuate portion of the cam plate and hence the pair of brake shoes can be opened outward quickly.

Further the drum brake apparatus may further comprises a swinging movement limiter, and wherein distances L1 and L2 are set to L1≠L2, where L1 is a distance between the center of curvature of the first shoe receiving arcuate portion and the center of the anchor pin and L2 is a distance between the center of curvature of the second shoe receiving arcuate portion and the center of the anchor pin, and wherein the swinging movement limiter limits the range of swinging movement of the respective cam plates, so that only one of the cam plates being smaller in distance between the center of the anchor pin and the center of curvature of the shoe receiving arcuate portion swings integrally with the cam supporting plate, and opens the brake shoes outward until the shoe clearance is eliminated.

In the drum brake apparatus thus configured, the amount of displacement of the brake shoes until the shoe clearance is eliminated is limited by the swinging movement limiter for controlling the range of the swinging movement of the respective cam plates, and consequently, the range of operation of an adjuster driving mechanism can be controlled. Therefore, it is not necessary to provide an over-adjust preventing function on an adjuster unit or the adjuster driving mechanism themselves, and hence simplification of the adjuster mechanism is achieved.

Further, in the drum brake apparatus, the first cam plate and the second cam plate may respectively comprise an anchor abutting arcuate portion rotatably slidable against the outer periphery of the anchor pin, and the drum brake apparatus further comprises a damper spring for alleviating an impact applied when each anchor abutting arcuate portion comes into abutment with the outer periphery of the anchor pin when controlling a torque.

In the drum brake apparatus thus configured, when the cam plate is pressed back and hits against the anchor pin by a brake power fed back to one of the cam plates during braking period, the impact of hitting is alleviated by the damper spring.

In addition, the drum brake apparatus may further comprises a strut, for opening one of the brake shoes by being displaced toward the one of the brake shoes when the operating force is fed from a parking lever, provided in a vacant space between the second cam plate and the input power receiving portion.

In the drum brake apparatus thus configured, the vacant space between the second cam plate and the input power receiving portion is effectively utilized as a space for providing the strut, and the position where the strut for the parking brake is provided is radially outwardly of the drum with respect to the operating force generator. Therefore, in comparison with the case in the related art in which the strut is provided inwardly of the operating force generator, a space around an axle is not oppressed by the arrangement of the strut any longer, and interference between a rotational body connected to the axle and the strut is positively prevented.

Further, in the drum brake apparatus, the strut may includes a guide groove extending in the direction of displacement caused by braking, and is supported by the cam supporting plate so as to be capable of moving along the direction of displacement caused by braking, by inserting a guide pin provided upright on the cam supporting plate into the guide groove.

In the drum brake apparatus thus configured, the strut can be held in the cam mechanism by inserting the guide pin of the cam supporting plate into the guide groove provided on the strut.

Further, in the drum brake apparatus, abutment between the strut for the parking brake and the parking lever may be maintained by an urging force applied by a resilient member.

In the drum brake apparatus thus configured, the state of abutment between the strut and the parking lever is stably maintained by the resilient member.

In addition, the drum brake apparatus may further comprises a resilient clip provided for retaining the components such as the first cam plate, the second cam plate, and the cam supporting plate in the assembled state.

In the drum brake apparatus thus configured, an assembling method of assembling the cam mechanism as a single unit in advance, and assembling the assembly to the anchor pin may be employed.

Further, in the drum brake apparatus, the input power receiving portion of the cam supporting plate may be configured in such a manner that a supporting shaft of the input power receiving portion, which comes into abutment with the output end of the operating force generator, is engaged and supported by a notch formed on the cam supporting plate.

In the drum brake apparatus thus configured, for example, when the cam mechanism is configured in such a manner that the pair of cam supporting plates sandwich the first cam plate and the second cam plate from both sides, the supporting shaft of the input power receiving portion can be used also as connecting means for connecting the pair of cam supporting plates to each other.

By employing a structure in which a column shaped outer peripheral surface of the input power receiving portion is brought into abutment with the operating force generator, the contact area between the operating force generator and the input power receiving portion can be minimized.

Further, in the drum brake apparatus, the first cam plate may be rotatably connected to the cam supporting plate by a first cam pin fitted to the cam supporting plate at the outer cam supporting position, the second cam plate may be rotatably connected to the cam supporting plate by a second cam pin fitted to the cam supporting plate at the inner cam supporting position, and each cam pins each may be provided with a positioning shaft passing through the cam supporting plate and projecting toward the root side of the anchor pin, and further, the cam supporting plate loosely fitted to the anchor pin may be located in the direction of the axis of the anchor pin by abutting the extremity of the positioning shaft of each cam pin against a flange projecting on the root side of the anchor pin.

In general, the root side of the anchor pin on which the cam supporting plate is loosely fitted is formed into an R-surface having an adequate radius of curvature in order to avoid concentration of a stress. Also, in order to prevent the rotating cam supporting plate from running on the R-surface of the anchor pin, the root portion of the anchor pin is provided with a running-on preventing washer. However, provision of this running-on preventing washer causes increase in number of components and increase in number of assembling steps.

On the other hand, in the drum brake apparatus thus configured, since the positioning shaft serves as a space for keeping the cam supporting plate from the root portion of an anchor pin by a predetermined distance in the axial direction, the cam supporting plate can be prevented from running on the R-surface of the anchor pin even when the running-on preventing washer is omitted.

Furthermore, in the drum brake apparatus, the extremity of the positioning shaft of the cam pin may be formed into a substantially semispherical surface.

In the drum brake apparatus thus configured, sliding friction generated when the extremity of the positioning shaft of the cam pin slides on the flange of the anchor pin in association with the rotation of the cam supporting plate can be restrained to a small value.

BRIEF DESCRIPTION OF THE DRAWINGS

FIGS. 4A to 4C are explanatory drawings showing the operation of the cam mechanism shown in FIG. 1, in which FIG. 4A shows a state when a brake is not put on, FIG. 4B shows a state in which the brake is put on during forward travel, and FIG. 4C is a state in which the brake is put on during backward travel.

FIGS. 7A to 7C are explanatory drawings showing the cam mechanism shown in FIG. 5, in which FIG. 7A shows a state when the brake is not put on, FIG. 7B shows a state in which the brake is put on during forward travel, and FIG. 7C is a state in which the brake is put on during backward travel.

DESCRIPTION OF THE PREFERRED EMBODIMENTS

Figure 1:
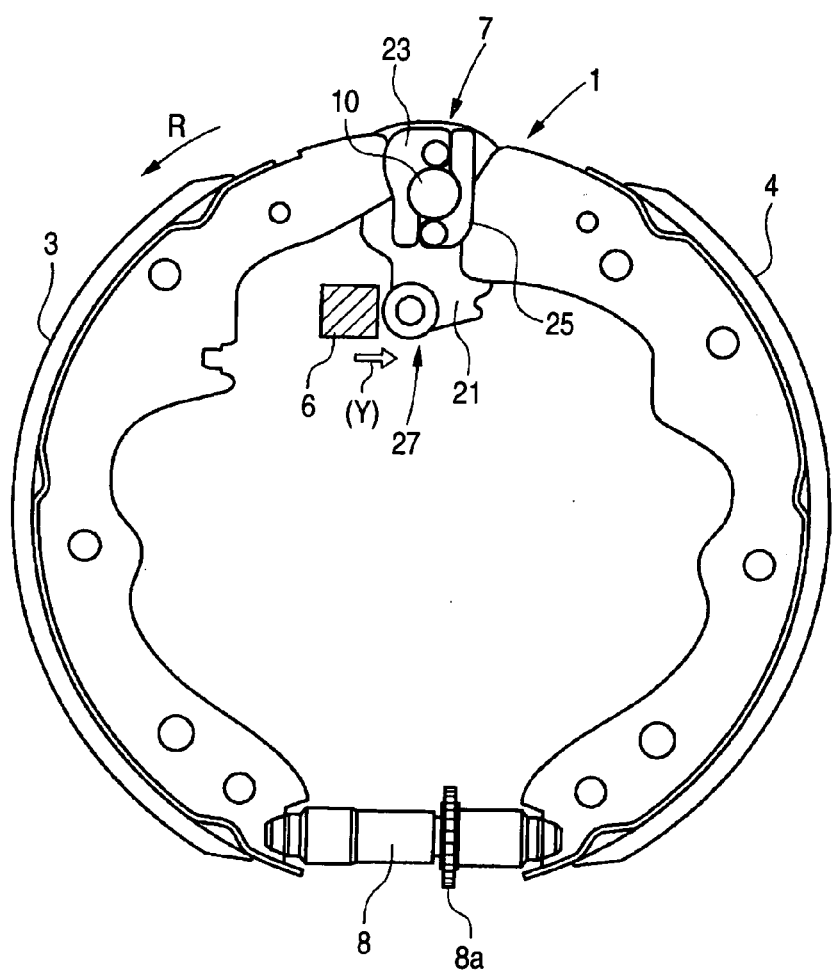
FIG. 1 is a front view showing a first embodiment of a drum brake apparatus according to the present invention.

Referring now to the drawings, preferred embodiments of a drum brake apparatus according to the present invention will be described.

First Embodiment

FIG. 1 is a front view showing a first embodiment of a drum brake apparatus according to the present invention.

The drum brake apparatus 1 according to the first embodiment is so-called duo-servo type drum brake apparatus, and includes a pair of brake shoes 3, 4 including a primary shoe 3 and a secondary shoe 4 disposed in a space in a substantially cylindrical drum, not shown, so as to oppose with each other, operating force generating means (a operating force generator) 6 disposed one of the opposite ends of the brake shoes 3, 4 for generating a shoe operating force for pressing the respective brake shoes 3, 4 against the drum when putting the service brake on, a cam mechanism 7 which is a shoe drive mechanism for transmitting an operating force generated by the operating force generating means 6, an adjuster unit 8 disposed between the other opposing end of the respective brake shoes 3, 4 having also a linking function for feeding an output power from the primary shoe 3 to the secondary shoe 4, and an anchor pin 10 provided on a backing plate, not shown, for supporting these components at one of the opposite ends of one of the pair of brake shoes 3, 4 so as to extend upright.

In FIG. 1, the backing plate and the drum are not shown. A shoe return spring for urging the ends of the respective brake shoes 3, 4 toward each other and a mechanism for driving the adjuster unit 8 are also not shown.

The drum which is not shown is concentric with the backing plate and rotates in the direction indicated by an arrow R in FIG. 1 when a vehicle travels forward.

The brake shoes 3, 4 are mounted to the backing plate by a shoe hold-down device, not shown, so as to be capable of moving toward the inner periphery of the drum.

The ends of the respective brake shoes 3, 4 on the side of the operating force generating means 6 are urged toward each other (that is, in the direction away from the drum) via a shoe return spring, not shown.

The ends of the respective brake shoes 3, 4 on the side of the adjuster unit 8 are also urged so as to maintain the state of being in abutment with the end of the adjuster unit 8 by an urging force of a shoe-to-shoe spring, not shown.

Figure 4A:
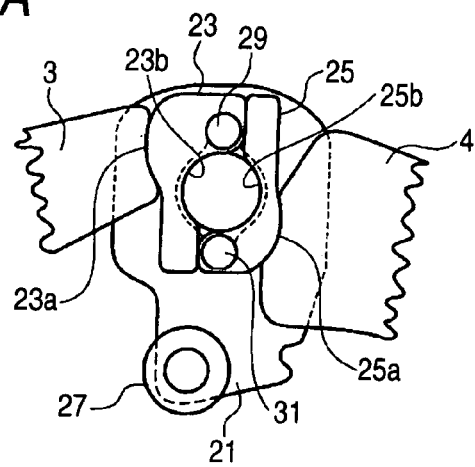
Figure 4B:
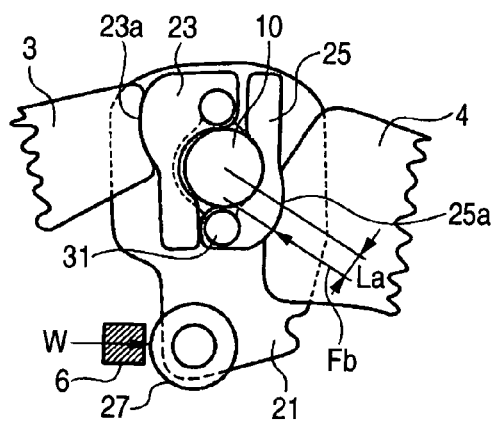
Figure 4C:
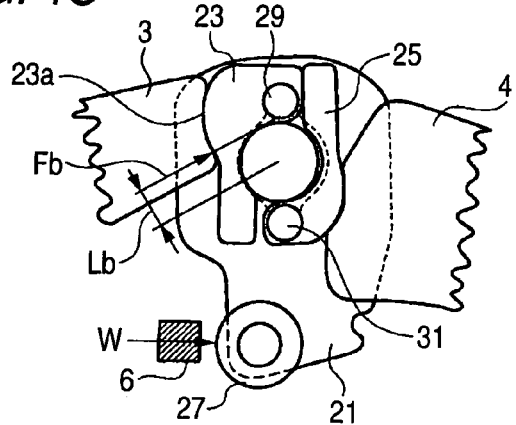

In the case of the present embodiment, the operating force generating means 6 is a hydraulic wheel cylinder which projects an output rod in the direction indicated by an arrow (Y) according to the braking operation of, for example, a brake pedal for service braking, and outputs a pressing force, which is a shoe operating force W (See FIGS. 4A to 4C)

The adjuster unit 8 is a member originally for adjusting a distance between the ends of the brake shoes 3, 4 depending on the extent of abrasion of the linings of the respective brake shoes 3, 4, and is configured to adjust the distance between the ends of the brake shoes 3, 4 automatically by rotating an adjusting gear 8a by the rotation of an adjuster lever, which rotates according to the amount of displacement of the brake shoes 3, 4 caused by braking.

The cam mechanism 7 of the present embodiment opens the respective brake shoes 3, 4 outward depending on the shoe operating force generated by the operating force generating means 6 to generate a braking force and controls the braking force by utilizing a brake power exerted by the brake shoes during braking period, the structure of which will be explained referring to FIG. 2 to FIG. 4C.

The cam mechanism 7 includes a pair of cam supporting plates 21 disposed so as to oppose in the direction of the axis of the anchor pin 10, and two cam plates 23, 25 including a first cam plate 23 and a second cam plate 25 to be assembled between the pair of supporting cam plates 21.

Figure 3:
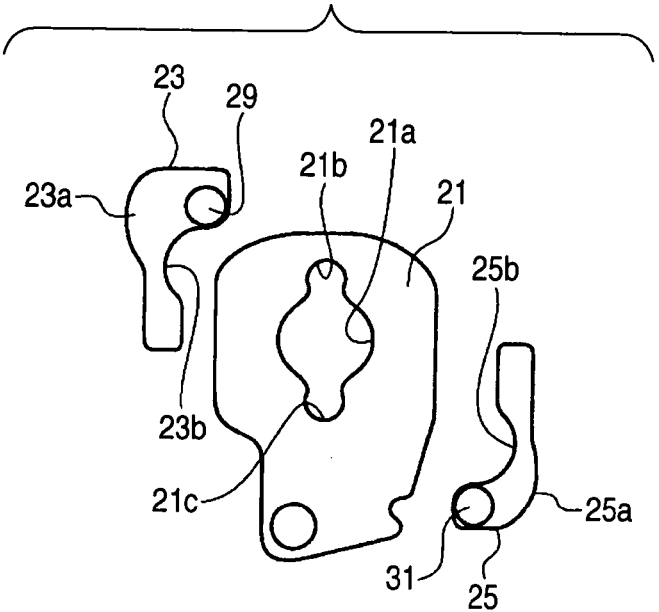
FIG. 3 is an exploded front view of the cam mechanism shown in FIG. 2.

As shown in FIG. 3, the cam supporting plates 21, 21 are provided with an anchor insertion hole 21a having an inner diameter larger than an outer diameter of the anchor pin 10, and is loosely and rotatably fitted on the anchor pin 10 via the anchor insertion hole 21a. The cam supporting plate 21 is provided with an input power receiving portion 27 for receiving the shoe operating force W from the operating force generating means 6 at a position radially inwardly of the drum which respect to the anchor pin 10.

Figure 2:
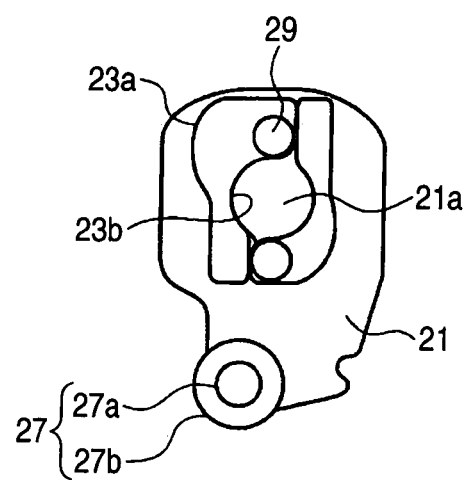
FIG. 2 is a front view of a cam mechanism of the drum brake apparatus shown in FIG. 1.

The input power receiving portion 27 has a structure in which a cylindrical roller 27b is rotatably fitted to a supporting shaft 27a which is bridged between the pair of cam supporting plates 21, 21 as shown in FIG. 2, and an output end of the operating force generating means 6 is brought into abutment with the outer peripheral surface of the roller 27b.

The first cam plate 23 is, as shown in FIG. 3 and FIG. 4A, rotatably connected to the cam supporting plate 21 at an outer cam supporting position, which is located radially outwardly of the drum, via the anchor pin 10, and includes a first shoe receiving arcuate portion 23a which comes into abutment with the end of the brake shoe 3 on one side, and an anchor abutting arcuate portion 23b which pivotably slides against the outer periphery of the anchor pin 10.

A cam pin 29 is provided so as to project at the position corresponding to the outer cam supporting position of the first cam plate 23, and when the cam pin 29 is fitted to a pin fitting hole 21b on the cam supporting plate 21, the first cam plate 23 is rotatably connected to the cam supporting plate 21.

The second cam plate 25 is, as shown in FIG. 3 and FIG. 4A, rotatably connected to the cam supporting plate 21 at an inner cam supporting position, which is a mid point between the anchor pin 10 and the input power receiving portion 27, is provided with a second shoe receiving arcuate portion 25a which abuts against the end of the other brake shoe 4 and an anchor abutting arcuate portion 25b which pivotably slides against the outer periphery of the anchor pin 10, and is disposed so as to oppose the first cam plate 23 with the intermediary of the anchor pin 10.

A cam pin 31 is provided so as to project at the position corresponding to the inner cam supporting position of the second cam plate 25, and when the cam pin 31 is fitted in a pin fitting hole 21c of the cam supporting plate 21, the second cam plate 25 is rotatably connected to the cam supporting plate 21.

In the case of the present embodiment, the pin fitting holes 21b, 21c on the cam supporting plate 21 are formed into a notch continuing from the anchor insertion hole 21a.

In the drum brake apparatus 1 thus configured, when the braking operation is started during forward travel, and the shoe operating force W is fed to the input power receiving portion 27 of the cam supporting plate 21 from the operating force generating means 6, as shown in FIG. 4B, the cam supporting plate 21 starts rotating by the shoe operating force W and then the braking action starts.

The cam supporting plate 21, being loosely fitted on the anchor pin 10, rotates about the cam supporting position (that is, the cam pin 31 at the inner cam supporting position) for the cam plate 25 on the side where the brake power from the brake shoe 4 is applied, to open the brake shoe 3 which is in abutment with the other cam plate 23 outward in the initial stage after brake is put on until a shoe clearance is eliminated, and then rotates about the anchor pin 10 and presses the pair of brake shoes 3, 4, to which the respective cam plates 23, 25 are in abutment, against the drum to generate the braking force after the shoe clearance is eliminated.

When the brake is put on as described above, a brake power Fb acting on the shoe receiving arcuate portion 25a of the cam plate 25 on one side generates a moment of rotation with the radius of La, which is a distance between a working point and the center of the anchor pin 10, and acts in the direction to reduce the amount of rotation of the cam supporting plate 21 about the anchor pin 10 to control the braking force so as not to exceed a predetermined magnification. Therefore, the braking force can be controlled according to the brake power and hence stable effect of the brake is ensured.

On the other hand, when the braking operation is initiated during backward travel and the shoe operating force W is fed to the input power receiving portion 27 of the cam supporting plate 21 from the operating force generating means 6, as shown in FIG. 4C, the cam supporting plate 21 starts rotating by the shoe operating force W and then the braking action starts.

In this case, in the initial stage of braking until the shoe clearance is eliminated, the cam supporting plate 21 rotates about the cam supporting position (that is, the cam pin 29 at the outer cam supporting position) for the cam plate 23 on the side which receives the brake power from the brake shoe 3 to open the brake shoe 4 which is in abutment with the other cam plate 25 outward, and after the shoe clearance is eliminated, rotates about the anchor pin 10 and presses the pair of brake shoes 3, 4 to which the respective cam plates 23, 25 are in abutment against the drum to generate the braking force.

Also when braking during backward travel as described above, the brake power Fb acting on the shoe receiving arcuate portion 23a of the cam plate 23 on one side generates a moment of rotation with the radius of Lb, which is a distance between the working point and the center of the anchor pin 10, and acts in the direction to reduce the amount of rotation of the cam supporting plate 21 about the anchor pin 10, and controls so that the braking force does not exceed a predetermined magnification in the same manner as braking during forward travel. Therefore, the braking force can be controlled according to the brake power, and the stable effect of the brake is ensured.

Since the cam mechanism 7 described above is disposed between the operating force generating means 6 and the respective brake shoes 3, 4 to mechanically control the braking force, not only the liquid pressure actuator such as the hydraulic wheel cylinder in the related art, but also an electric actuator such as an electric motor can be employed as the operating force generating means 6, and electrification for achieving intelligent braking function and hybrid vehicle can also be achieved easily.

In addition, for example, when braking during forward travel, the cam supporting plate 21 rotates about the cam pin 31 of the inner cam supporting position which is a position shifted from the anchor pin 10 toward the operating force generating means 6 in the initial stage of braking until the shoe clearance is eliminated. Therefore, in comparison with the braking behavior after the shoe clearance is eliminated (that is, the behavior of the cam supporting plate 21 to rotate about the anchor pin 10 for opening the brake shoes outward), the radius of rotation of the shoe receiving arcuate portion 23a which presses the brake shoe 3 on one side increases and hence the shoe receiving arcuate portion 23a is displaced significantly with respect to the slight rotation of the cam supporting plate 21.

In other words, since the cam supporting plate 21 can magnify the displacement fed from the operating force generating means 6 and output the same by the rotation about the inner cam supporting position which is a position shifted from the anchor pin 10 toward the operating force generating means 6 in the initial stage of braking, even when the amount of displacement which is applied by the operating force generating means 6 to the input power receiving portion 27 of the cam supporting plate 21 is small, a significant displacement can be secured at the shoe receiving arcuate portion 23a of the first cam plate 23 and hence the pair of brake shoes 3, 4 can be opened outward quickly.

Therefore, by reducing displacement of the output of the operating force generating means 6, compact operating force generating means 6 and the improved responsiveness of braking action are achieved. Also, when the liquid pressure actuator such as the hydraulic wheel cylinder is used for the operating force generating means 6, the quantity of liquid used in the initial stage of braking is reduced so that the compact operating force generating means 6 and improved responsiveness of braking action are achieved.

Since the cam plates 23, 25 on the cam supporting plate 21 are two separate pieces each of which is mounted to each of brake shoe 3, 4, engagement with the anchor pin 10 falls within the range of 180°, and hence rotational resistance is reduced when compared with the case of opening the pair of brake shoes outward by a single cam plate. When the rotational resistance is reduced, occurrence of disadvantages such as scooping is prevented so that smooth operation is achieved.

Second Embodiment

FIG. 5 to FIG. 7C show a second embodiment of the drum brake apparatus according to the present invention.

A drum brake apparatus 1A of the second embodiment is characterized in that a cam mechanism 7A for opening the pair of brake shoes 3, 4 outward is provided with a function for preventing over-adjusting of the adjuster unit 8.

In the drum brake apparatus 1A and the cam mechanism 7A, components common to the drum brake apparatus 1 and the cam mechanism 7 are designated by the same reference numerals or equivalent reference numerals, and description will not be made or simplified.

Figure 5:
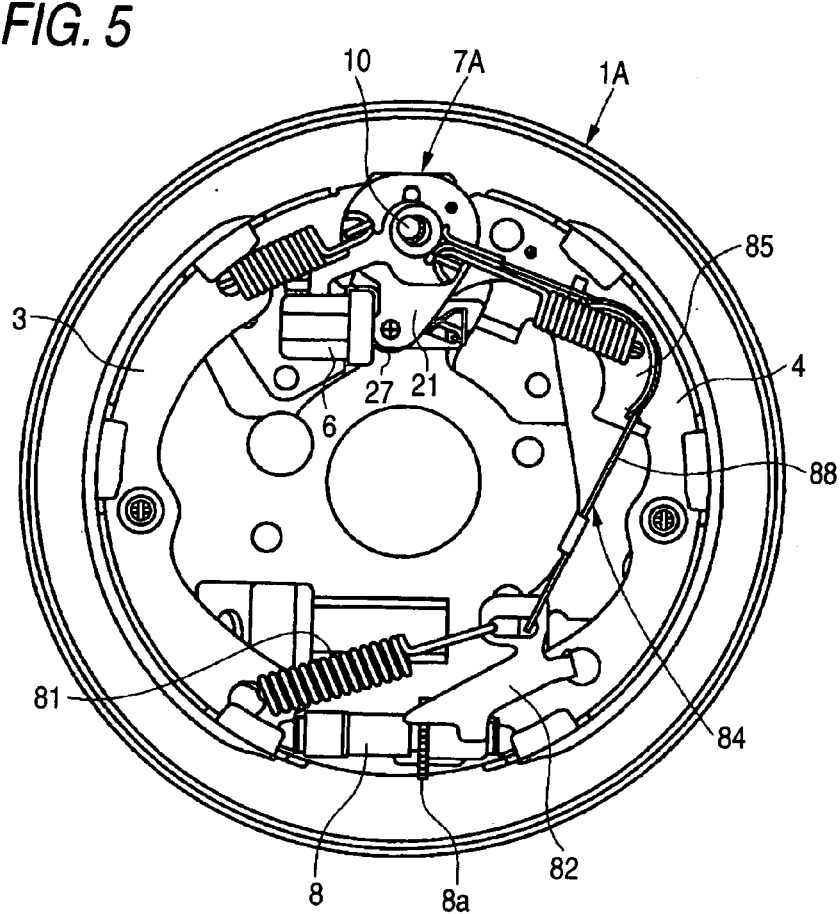
FIG. 5 is a front view showing a second embodiment of the drum brake apparatus according to the present invention.

The adjuster unit 8 provided on the drum brake apparatus 1A adjusts the distance between the ends of the brake shoes 3, 4 according to the extent of abrasion of the lining of the respective brake shoes 3, 4, and is configured to adjust the distance between the ends of the brake shoes 3, 4 automatically by rotating an adjuster lever 82, the extremity of which is abutted against the adjusting gear 8a on the adjuster unit 8 by an urging force of an adjuster spring 81, as shown in FIG. 5.

An adjuster drive mechanism 84 is connected to the adjuster lever 82.

In this embodiment, the adjuster drive mechanism 84 includes an adjuster link 85 rotatably supported by an web of the secondary shoe 4, and an adjuster cable 88 connected at one end to the anchor pin 10 and at the other end to the adjuster lever 82 via the adjuster link 85, so that a rotational force is provided to the adjuster lever 82 according to the amount of movement of the secondary shoe 4 during braking period to control the extension of the adjuster unit 8.

Figure 6:
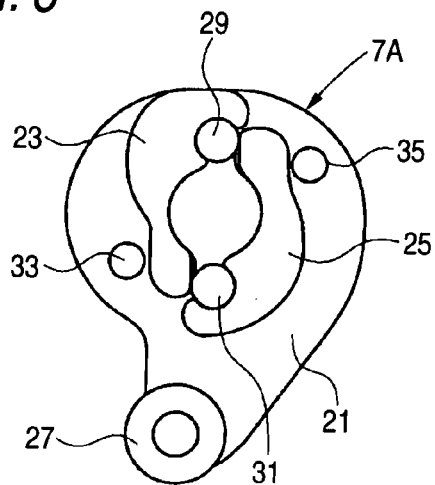
FIG. 6 is a front view showing a structure of the cam mechanism shown in FIG. 5.

As also shown in FIG. 6, the cam mechanism 7A in the second embodiment is configured in such a manner that the first cam plate 23 and the second cam plate 25 are rotatably connected on the cam supporting plate 21, which is loosely fitted on the anchor pin 10, and the basic structure is common to the cam mechanism 7 in the first embodiment.

Figure 7A:
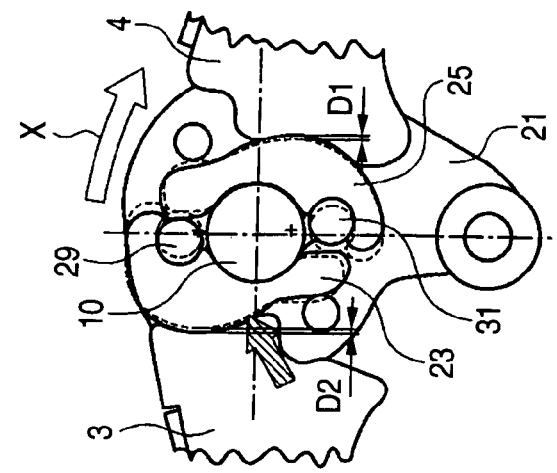

However, as shown in FIG. 7A, the cam mechanism 7A in the present embodiment includes swinging movement control means (a swing movement limiter) 33, 35 for limiting the range of swinging movement of the respective cam plates 23, 25 (the amount of movement c corresponding to the shoe clearance) in such a manner that distances L1 and L2 are set to L1≠L2, where L1 is a distance between the center of curvature O1 of the first shoe receiving arcuate portion 23a of the first cam plate 23 and the center of the anchor pin 10 and L2 is a distance between the center of curvature O2 of the second shoe receiving arcuate portion 25a of the second cam plate 25 and the center of the anchor pin 10, so that only the cam plate being smaller in distance between the center of the anchor pin 10 and the center of curvature of the shoe receiving arcuate portion (the second cam plate 25 in this embodiment) swings integrally with the cam supporting plate 21 and opens the brake shoes by the first cam plate 23, which rotates on the cam supporting plate 21 in the direction away from the anchor pin 10, until the shoe clearance is eliminated.

The swinging movement limiters 33, 35 are limit pins provided upright on the cam supporting plate 21 so as to limit the movement of the respective cam plates 23, 25 by abutment against the outer surfaces of the respective cam plates 23, 25.

Figure 7B:
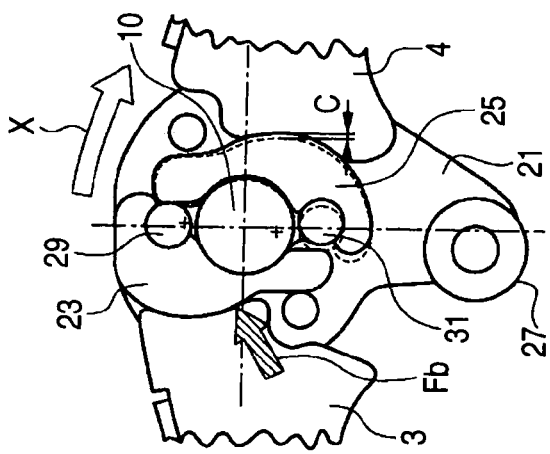

As shown in FIG. 7B, in the drum brake apparatus 1A described above, when the braking operation is initiated during travel in which the drum rotates in the direction indicated by an arrow X (for example, during backward travel) and the shoe operating force W is fed to the input power receiving portion 27 of the cam supporting plate 21 from the operating force generating means 6, the cam supporting plate 21 rotates about the cam pin 29 of the first cam plate 23, to which the brake power Fb is supplied and only the brake shoe 4 on one side is opened outward and displaced via the second cam plate 25 in the initial stage of braking until the shoe clearance is eliminated. In this case, the first cam plate 23 does not move and stays at the initial position. The movement of the brake shoe 4 decreases by the rate of L2/(L1+L2) with respect to the rigidity and thermal expansion of the drum.

Then, the mounting positions of the swinging movement limiters 33, 35 are set so that the second cam plate 25 can move until the shoe clearance is eliminated only by the movement of the brake shoe 4. The amount of movement c of the second cam plate 25 until the shoe clearance is eliminated is set to a value substantially equal to the amount of movement of the brake shoe 4 until the shoe clearance is eliminated, and the range of movement corresponds to the operating range of the adjuster drive mechanism 84.

Figure 7C:
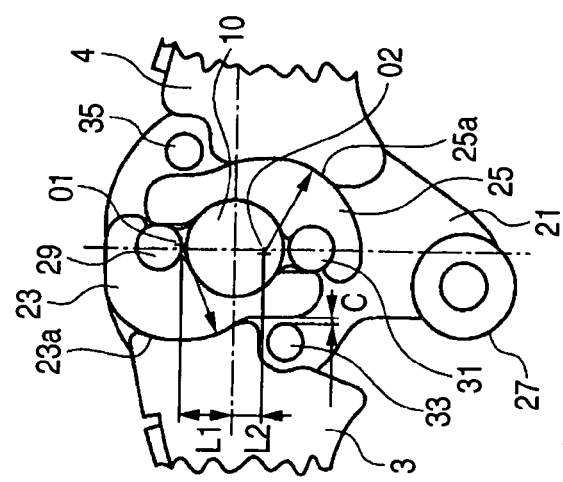
Figure 8:
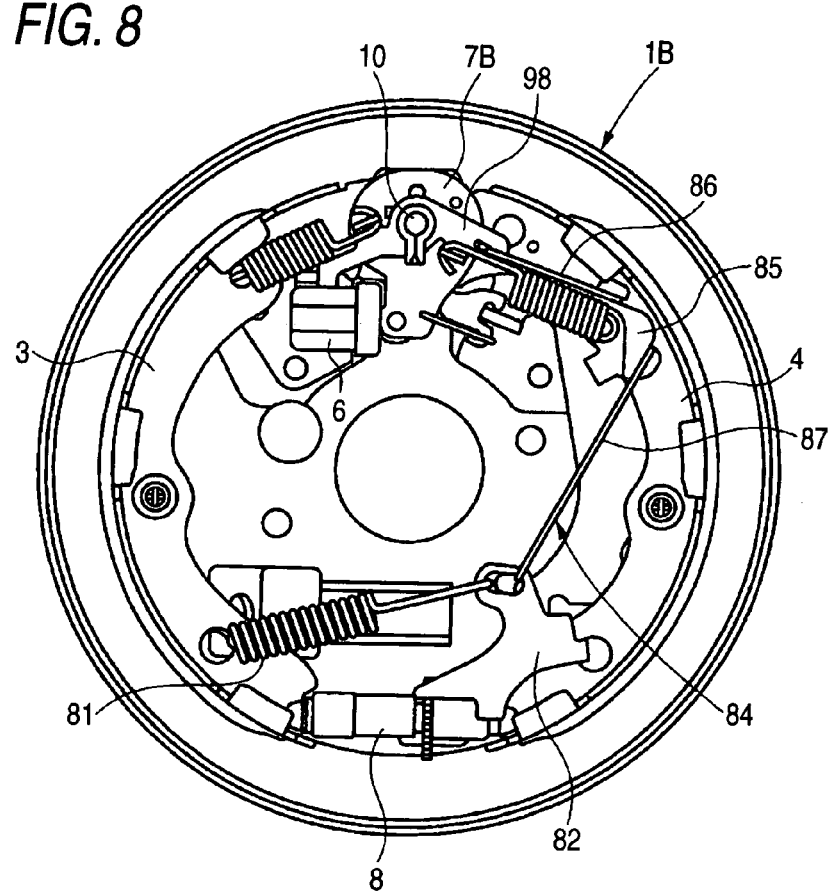
FIG. 8 is a front view showing a third embodiment of the drum brake apparatus according to the present invention.
Figure 9:
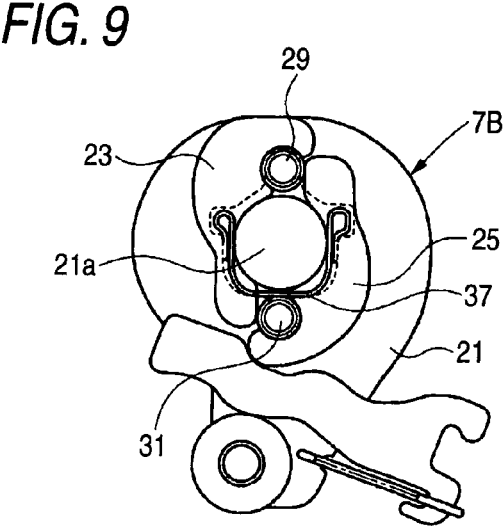
FIG. 9 is a front view showing a mounting state of a damper spring of the cam mechanism shown in FIG. 8.

Once the shoe clearance is eliminated and the respective brake shoes 3, 4 abut against the inner peripheral surface of the drum, the first cam plate 23, which serves as an anchor, rotates outward and starts opening the brake shoe 3 outward as shown in FIG. 7C, and from then on, the ratio of the amounts of movement of the left and right brake shoes 3, 4 becomes D2:D1.

Therefore, the amount of movement of the brake shoe 4 for driving the adjuster unit 8 is D1/(D1+D2) with respect to the total amount of movement of the brake shoes 3, 4.

In the drum brake apparatus 1A thus configured, the amount of displacement of the respective brake shoes 3, 4, which is occurred until the shoe clearance is eliminated, is controlled by the swinging movement limiter 33, 35 for controlling the range of swinging movement of the respective cam plates 23, 25, so that the operating range of the adjuster drive mechanism 84 can be controlled. Therefore, the adjuster unit 8 or the adjuster drive mechanism 84 themselves are not necessary to have the over-adjust preventing function, so that simplification of the adjuster mechanism is achieved.

Third Embodiment

FIG. 8 to FIG. 11 show a third embodiment of the drum brake apparatus according to the present invention.

A drum brake apparatus 1B in the third embodiment is characterized in that a damper spring 37 is built in a cam mechanism 7B for opening the pair of brake shoes 3, 4 outward.

In the drum brake apparatus 1B, the structure other than the cam mechanism 7B may be common to that of the first embodiment or of the second embodiment, and the common components are designated by the same reference numeral and description will not be made.

The structure of the cam mechanism 7B may be common to the cam mechanism 7 shown in the first embodiment other than the damper spring 37, and hence the common components are designated by the same reference numerals and description will be omitted.

When controlling the torque according to the brake power, the damper spring 37 provided on the cam mechanism 7B serves to alleviate an impact occurred when the anchor abutting arcuate portions 23b, 25b (See FIG. 3) of the respective cam plates 23, 25 abut against the outer periphery of the anchor pin 10 by the returning actions of the respective cam plates 23, 25.

Figure 10:
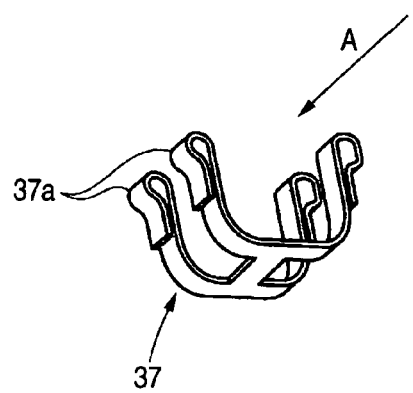
FIG. 10 is a perspective view of the damper spring shown in FIG. 9.
Figure 11:
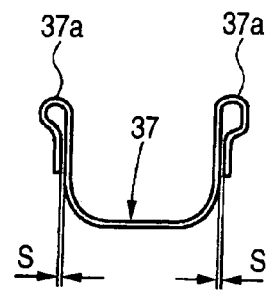
FIG. 11 is a drawing viewed in the direction indicated by an arrow A in FIG. 10.

The damper spring 37 has a structure in which a plurality of spring portions 37a interposed between the anchor pin 10 and the respective anchor abutting arcuate portions 23b, 25b are formed integrally by press-molding a metal plate, as shown in FIG. 10. The spring portions 37a absorb the impact by resilient deformation corresponding to the amount of opening and closing of a space s, as also shown in FIG. 11.

In the case of the present embodiment, the adjuster drive mechanism 84 includes the adjuster link 85 rotatably supported by the web of the secondary shoe 4, a first adjuster rod 86 connected to a supporting plate 98 fixed to and engaged with the anchor pin 10 at one end, and connected to the adjuster link 85 at the other end, and a second adjuster rod 87 connected to the adjuster link 85 at one end, and connected to the adjuster lever 82 at the other end, so that the rotational force is provided to the adjuster lever 82 according to the amount of movement of the secondary shoe 4 caused by braking to control the extension of the adjuster unit 8.

In the drum brake apparatus 1B thus configured, when the cam plate is pressed back and hits against the anchor pin 10 by a brake power fed back to one of the cam plates during braking period, the impact of hitting is alleviated by the damper spring 37. Therefore, the impact of hitting between the returning cam plate and the anchor pin 10 can be alleviated, and hence abrasion or the like caused by such hitting is restrained, so that durability of the components may be improved. In addition, generation of hitting sound can be restrained so that tranquility is achieved.

Also, since the damper spring 37 used here is formed into a single unit so that the pair of cam plates 23, 25 can be supported resiliently by the single damper spring 37, increase in number of components can be restrained, and improved assembleability of the damper spring 37 is achieved.

Fourth Embodiment

Figure 12:
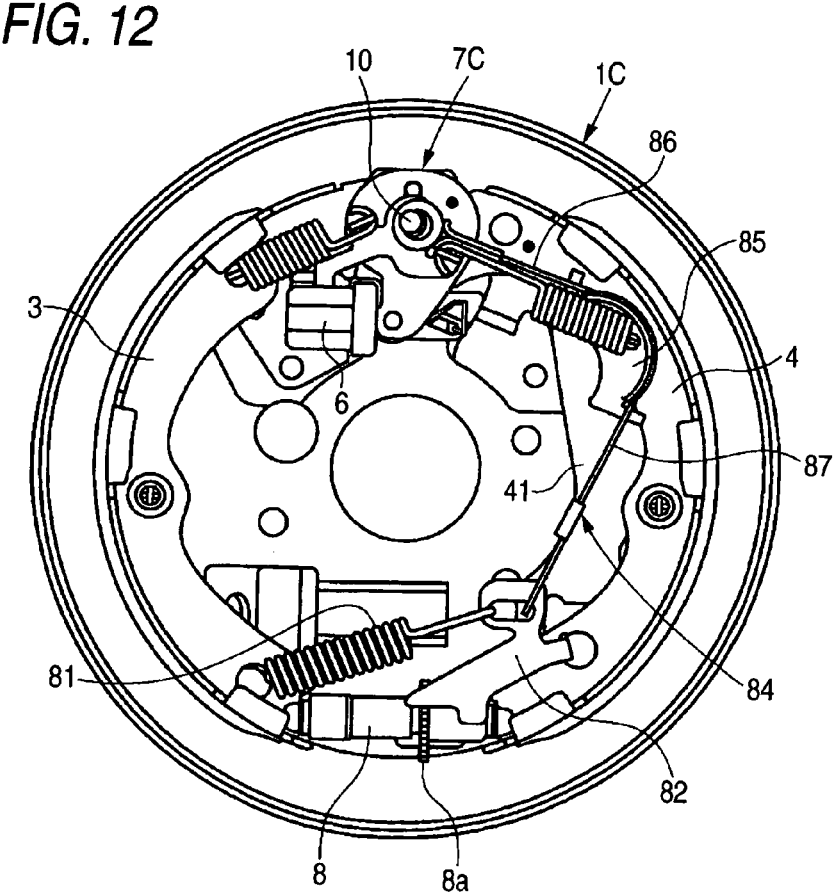
FIG. 12 is a front view showing a fourth embodiment of the drum brake apparatus according to the present invention.
Figure 13:
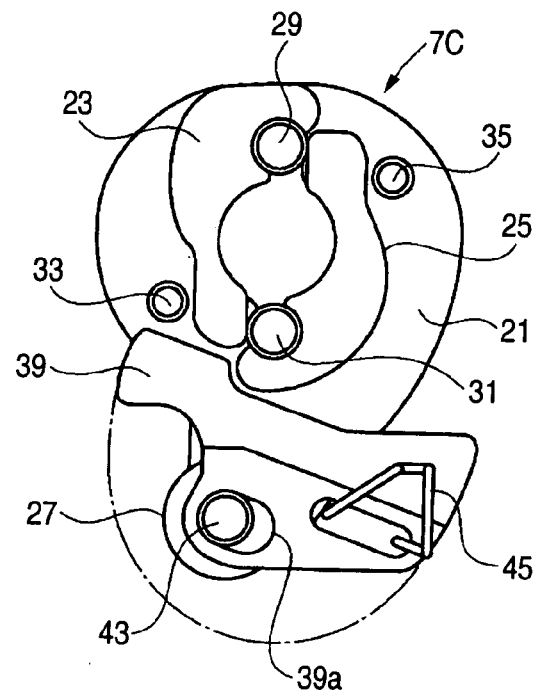
FIG. 13 is a front view showing a state in which a strut for parking brake is built in the cam mechanism shown in FIG. 12.
Figure 14:
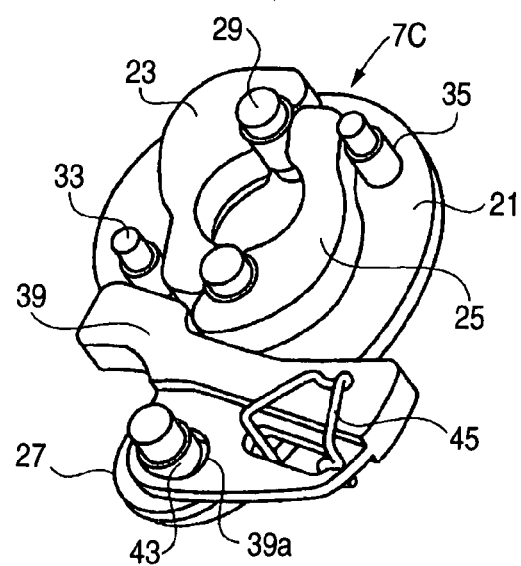
FIG. 14 is a perspective view of the cam mechanism shown in FIG. 12.
Figure 15:
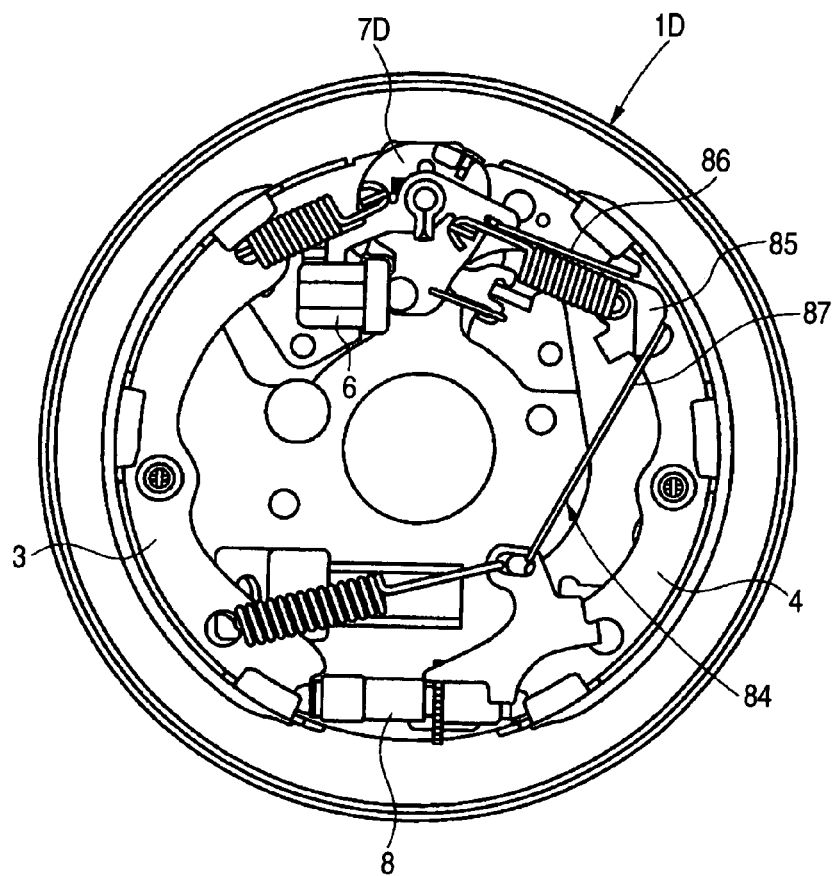
FIG. 15 is a front view of a fifth embodiment of the drum brake apparatus according to the present invention.

FIG. 12 to FIG. 14 show a fourth embodiment of the drum brake apparatus according to the present invention.

A drum brake apparatus 1C of the fourth embodiment is characterized in that a strut 39 for parking brake is built in a cam mechanism 7C for opening the pair of brake shoes 3, 4 outward.

In the drum brake apparatus 1C, the structure other than the cam mechanism 7C may be common to that of the first embodiment or the second embodiment, and the common components are designated by the same reference numerals and description will not be made.

The structure of the cam mechanism 7C may be common to the cam mechanism 7A shown in the second embodiment other than the strut 39, and the common components are designated by the same reference numerals and description will not be made.

The strut 39 is displaced toward the brake shoe 3 on one side by the operating force fed to one end thereof by the swinging movement of a parking lever 41 to open the brake shoe 3 outward, and is disposed in a vacant space between the second cam plate 25 and the input power receiving portion 27.

In the case of the present embodiment, since a guide pin 43 provided upright on the cam supporting plate 21 is inserted into a guide groove 39a extending in the direction of displacement caused by braking, the strut 39 is supported by the cam supporting plate 21 so as to be capable of moving along the direction of displacement caused by braking.

In the case of the present embodiment, the guide pin 43 is formed coaxially with the supporting shaft 27a (See FIG. 2), which constitutes the input power receiving portion 27, to restrain increase in number of components.

In the case of the present embodiment, abutment between the strut 39 and the parking lever 41 is maintained by an urging force of a resilient member 45.

The resilient member 45 is formed by bending a spring steel wire or the like into a predetermined shape, and resiliently clamps the strut 39 and the parking lever 41 so that abutment therebetween is maintained.

In the drum brake apparatus 1C configured as described above, the vacant space between the second cam plate 25 and the input power receiving portion 27 is effectively utilized as a space for providing the strut 39, and the position where the strut 39 for parking brake is provide is located radially outwardly of the drum with respect to the operating force generating means 6. Therefore, in comparison with the case in the related art in which the strut is provided inwardly of the operating force generating means 6, the space around the axle is not oppressed by the arrangement of the strut any longer, and interference between the rotational body connected to the axle and the strut 39 is positively prevented, and simultaneously, the parking brake may be provide in a compact space.

In the drum brake apparatus 1C described above, the strut 39 may be held by the cam mechanism 7c by inserting the guide pin 43 of the cam supporting plate 21 into the guide groove 39a provided on the strut 39, and hence the cam mechanism 7C can be assembled to the anchor pin 10 as a single unit, which is assembled in a form including the strut 39 built therein. Therefore, in comparison with the case in which the strut 39 and the cam mechanism 7C are assembled around the anchor pin 10 separately, increase in number of assembling steps may be reduced, and hence improved assembleability is achieved.

In addition, in the drum brake apparatus 1C described above, since the state of abutment of the strut 39 and the parking lever 41 is stably maintained by the resilient member 45, the strut 39 and the parking lever 41 can be maintained in a stable state of abutment, and smooth operation when the parking brake is applied is achieved.

Fifth Embodiment

FIG. 15 to FIG. 19 show a fifth embodiment of the drum brake apparatus according to the present invention.

A drum brake apparatus 1D of the fifth embodiment includes a cam mechanism 7D for opening the pair of brake shoes 3, 4 outward improved so as to be capable of being attached to the anchor pin 10 in the state of being assembled in advance.

In the drum brake apparatus 1D, the structure other than the cam mechanism 7D may be common to those in the first to fourth embodiments, and the common components are designated by the same reference numeral and description will not be made.

The structure of the cam mechanism 7D may be common to the cam mechanism 7B in the third embodiment other than that a resilient clip 51 is additionally provided. The common components are designates by the same reference numerals and description will not be made.

Figure 16:
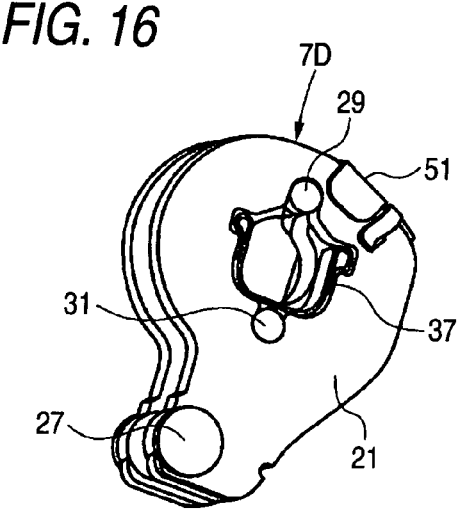
FIG. 16 is a perspective view showing a state in which respective components of the cam mechanism shown in FIG. 15 are assembled.
Figure 17:
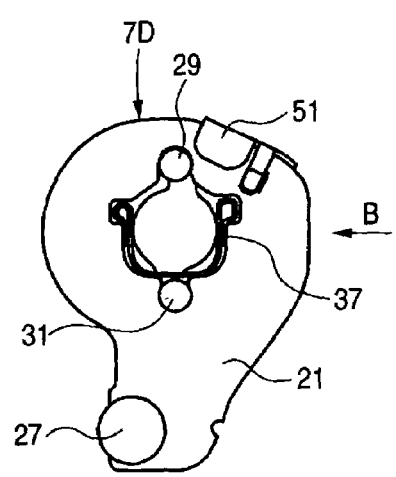
FIG. 17 is front view of an assembly of the cam mechanism shown in FIG. 16.
Figure 18:
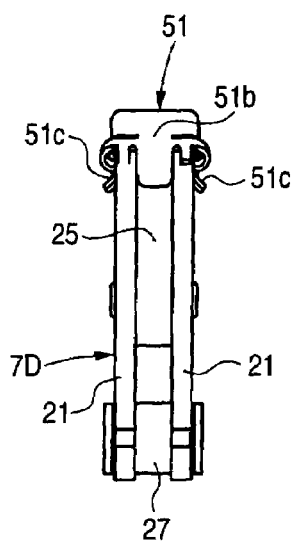
FIG. 18 is a view when viewed in the direction indicated by an arrow B in FIG. 17.

The resilient clip 51 is formed by press-molding a metal plate, and clamps the pair of cam supporting plates 21 to which the first cam plate 23 and the second cam plate 25, which are components of the cam mechanism 7D, are assembled to maintain these components in the assembled state as shown in FIG. 16 to FIG. 18.

Figure 19:
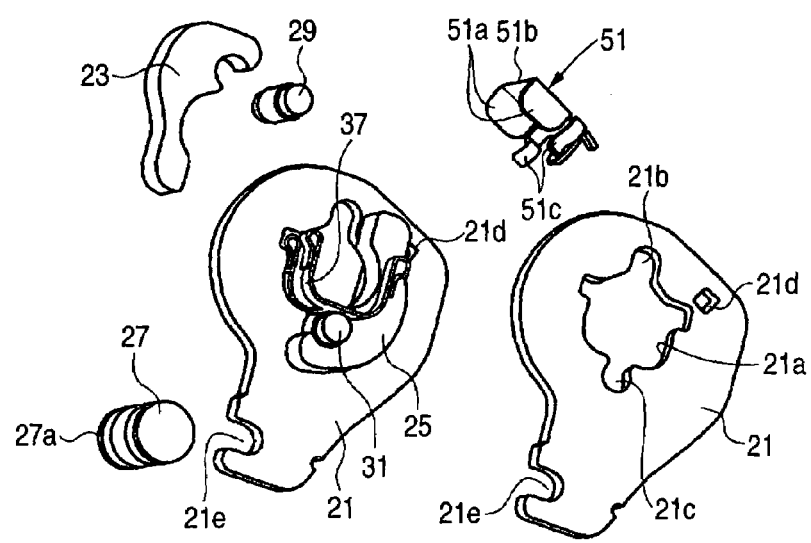
FIG. 19 is an exploded perspective view of the cam mechanism shown in FIG. 15.

The resilient clip 51, as shown in FIG. 19, includes a pair of resilient strips 51a for clamping the pair of cam supporting plates 21 from the outside, a connecting portion 51b for connecting these resilient strips 51a, and an engaging strip 51c which resiliently engages engaging holes 21d formed on the pair of cam supporting plates 21 for maintaining the clamping state.

Also, in the case of the present embodiment, as shown in FIG. 19 as well, the supporting shaft 27a of the input power receiving portion 27, which abuts the output end of the operating force generating means 6, is engaged with and supported by a notch 21e formed on the cam supporting plate 21.

In the drum brake apparatus 1D thus configured, since an assembling method in which the cam mechanism 7D is assembled as a single unit in advance, and then the assembly is assembled to the anchor pin 10 may be employed, improvement of efficiency of assembly is achieved in comparison with the case in which the respective components of the cam mechanism 7D are assembled around the anchor pin 10 in sequence one by one.

Also, in the cam mechanism 7D of the drum brake apparatus 1D, since the supporting shaft 27a of the input power receiving portion 27 can also be used as connecting means for connecting the pair of cam supporting plates 21 to each other, increase in number of components may be prevented.

In addition, by employing the structure in which the column shaped outer peripheral surface of the input power receiving portion 27 is brought into abutment with the operating force generating means 6, the contact surface between the operating force generating means 6 and the input power receiving portion 27 is minimized so that a favorable contact state in which generation of kinking may be prevented can be obtained easily.

Figure 20:
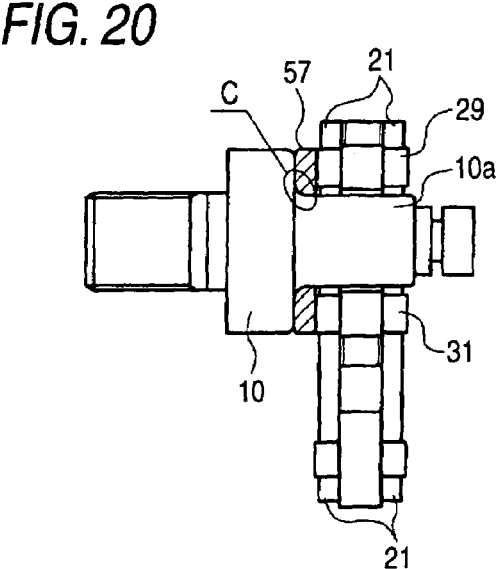
FIG. 20 is a vertical cross-sectional view showing a mounting state of the cam mechanism to an anchor pin.
Figure 21:
FIG. 21 is an enlarged drawing showing a section C in FIG. 20.
Figure 22:
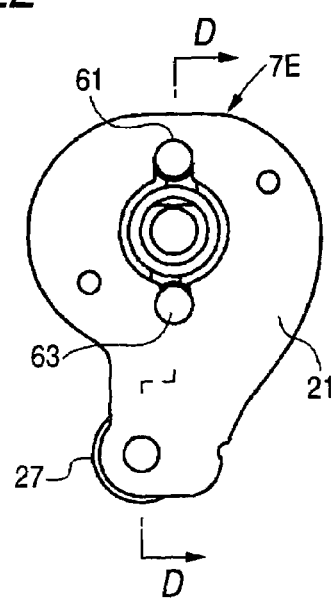
FIG. 22 is a front view of a cam mechanism in a sixth embodiment of the drum brake apparatus according to the present invention.

As shown in FIG. 20 and FIG. 21, the root portion of the cam supporting shaft 10*a* of the anchor pin 10 on which the cam supporting plate 21 in the respective embodiments is loosely fitted is formed into an R-surface 55 having an adequate radius of curvature in order to avoid concentration of a stress. Also, in order to prevent the rotating cam supporting plate 21 from running on the R-surface 55 of the anchor pin 10, the root of the cam supporting shaft 10*a* is normally provided with a running-on preventing washer 57 as shown in FIG. 20. However, provision of this running-on preventing washer 57 causes increase in number of components and increase in number of assembling steps.

Sixth Embodiment

Figure 23:
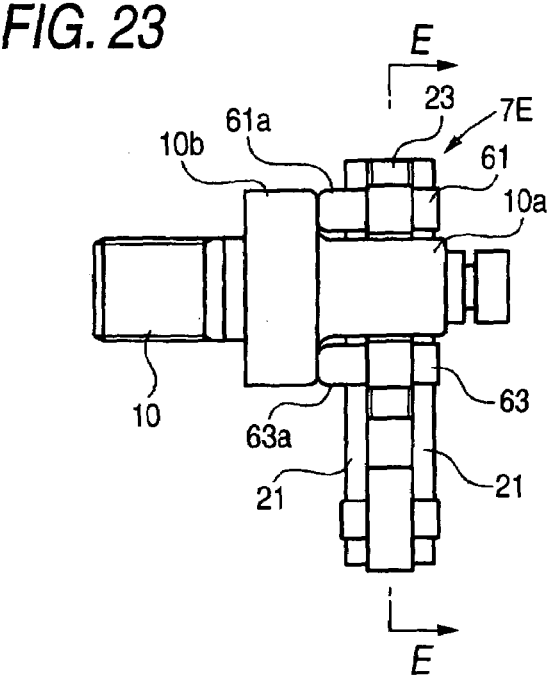
FIG. 23 is a cross-sectional view taken along the line D—D in FIG. 22.
Figure 24:
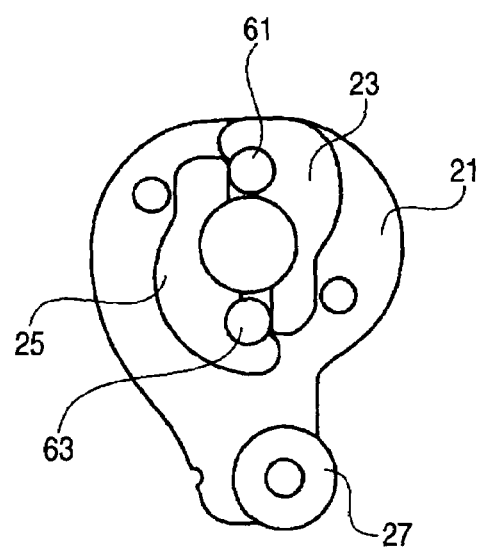
FIG. 24 is a cross-sectional view taken along the line E—E in FIG. 23.

FIG. 23 to FIG. 24 show a sixth embodiment of the cam mechanism which can be used in the drum brake apparatus according to the present invention.

In a cam mechanism 7E of this embodiment, the first cam plate 23 is rotatably connected to the cam supporting plate 21 by a first cam pin 61, which is fitted to the cam supporting plate 21 at the outer cam supporting position which is a position shifted away from the anchor pin 10 radially outwardly of the drum, and the second cam plate 25 is rotatably connected to the cam supporting plate 21 by a second cam pin 63, which is fitted to the cam supporting plate 21 at the inner cam supporting position which is a position shifted from the anchor pin 10 radially inwardly of the drum.

As shown in FIG. 23, the respective cam pins 61, 63 are provided with positioning shafts 61*a*, 63*a* passing through the cam supporting plate 21 and projecting toward the root of the anchor pin 10 and the extremities of the positioning shafts 61*a*, 63*a* are formed into a substantially semi-spherical surface.

As shown in FIG. 23, the cam supporting plate 21 loosely fitted to the cam supporting shaft 10*a* of the anchor pin 10 is located in the direction of the axis of the anchor pin 10 by bringing the extremities of the positioning shafts 61*a*, 63*a* into abutment with a O 19*b* projecting toward the root of the anchor pin 10.

In the cam mechanism 7E thus configured, since the positioning shafts 61*a*, 63*a* serve as a spacer for maintaining the cam supporting plate 21 at a distance away from the root portion of the cam supporting shaft 10*a* in the axial direction, the cam supporting plate 21 can be prevented from running on the R-surface of the anchor pin 10 even when the running-on preventing washer 57 (see FIG. 20) is omitted.

Therefore, the number of components may be reduced by eliminating provision of the running-on preventing washer 57.

Since the extremities of the positioning shafts 61*a*, 63*a* of the respective cam pins 61, 63, which come into abutment with the flange 10*b* of the anchor pin 10, are formed into a substantially semi-spherical surface, sliding friction generated when the extremities of the positioning shafts 61*a*, 63*a* of the cam pin slide on the flange 10*b* of the anchor pin 10 in association with the rotation of the cam supporting plate 21 can be restrained to a small value.

In the drum brake apparatus according to the present invention, when the brake is put on, the brake power applied to the shoe receiving arcuate portion on one of the cam plates acts in the direction to reduce the amount of rotation of the cam supporting plate about the anchor pin to control the braking force so as to exceed the predetermined magnification. Therefore, the braking force can be controlled according to the brake power and stable effect of the brake is ensured.

Since the cam mechanism which presses the pair of brake shoes against the drum is disposed between the operating force generating means and the respective brake shoes to mechanically control the braking force, not only the liquid pressure actuator such as the hydraulic wheel cylinder in the related art, but also an electric actuator such as an electric motor can be employed as the operating force generating means, and electrification for achieving intelligent braking function and hybrid vehicle can also be achieved easily.

In addition, since the cam supporting plate can magnify the displacement fed from the operating force generating means and output the same by the rotation about the inner cam supporting position which is a position shifted from the anchor pin toward the operating force generating means in the initial stage of braking, even when the amount of displacement which is applied by the operating force generating means to the input power receiving portion of the cam supporting plate is small, a significant displacement can be secured at the shoe receiving arcuate portion of the first cam plate and hence the pair of brake shoes can be opened outward quickly.

Therefore, by reducing displacement of the output of the operating force generating means, compact operating force generating means and the improved responsiveness of braking action are achieved. Also, when a liquid pressure actuator such as the hydraulic wheel cylinder is used for the operating force generating means, the quantity of liquid used in the initial stage of braking is reduced so that the compact operating force generating means and improved responsiveness of braking action are achieved.

Also, since the cam plates on the cam supporting plate are of two separate pieces each of which is mounted to each of brake shoe, in comparison with the case of opening the pair of brake shoes by a single cam plate, occurrence of disadvantages such as scooping is prevented by reducing rotational resistance, so that smooth operation is achieved.

What is claimed is:

1. A drum brake apparatus comprising:
   a first and a second brake shoes disposed in a drum to oppose each other; and
   a cam mechanism for generating a braking force by opening the first and second brake shoes outward according to a shoe operating force generated by an operating force generator, and for controlling the braking force by utilizing a reaction force exerted from the brake shoes during a braking period,
   wherein the cam mechanism includes:
   a cam supporting plate, having a central circular aperture portion is continuous with two opposed circular aperture portions, loosely and rotatably fitted on an anchor pin projecting upright on a backing plate, and having an input power receiving portion for receiving the shoe operating force at a position radially inwardly of the drum with respect to the anchor pin;
   a first cam plate, rotatably connected to the cam supporting plate at an outer cam supporting position which is located radially outwardly of the drum with respect to the anchor pin, and having a first shoe receiving arcuate portion which comes into abutment with an end of one of the brake shoes; and
   a second cam plate, rotatably connected to the cam supporting plate at an inner cam supporting position along a point between the anchor pin and the input power receiving portion, and having a second shoe receiving arcuate portion which comes into abutment with the end of the other brake shoe.

2. The drum brake apparatus according to claim 1, wherein the first cam plate and the second cam plate respectively comprise an anchor abutting arcuate portion rotatably slidable against the outer periphery of the anchor pin, further comprising:
a damper spring for alleviating an impact applied when each anchor abutting arcuate portion comes into abutment with the outer periphery of the anchor pin when controlling a torque.

3. The drum brake apparatus according to claim 1, further comprising a strut, for opening one of the brake shoes by being displaced toward the one of the brake shoes when the operating force is fed from a parking lever, provided in a vacant space between the second cam plate and the input power receiving portion.

4. The drum brake apparatus according to claim 3, wherein the strut includes a guide groove extending in the direction of displacement caused by braking, and is supported by the cam supporting plate so as to be capable of moving along the direction of displacement caused by braking, by inserting a guide pin provided upright on the cam supporting plate into the guide groove.

5. The drum brake apparatus according to claim 3, further comprising a resilient member for maintaining abutment between the strut for the parking brake and the parking lever.

6. The drum brake apparatus according to claim 1, further comprising a resilient clip for retaining the first cam plate, the second cam plate, and the cam supporting plate in the assembled state.

7. The drum brake apparatus according to claim 1, wherein the input power receiving portion of the cam supporting plate includes a supporting shaft, which comes into abutment with the output end of the operating force generator, engaged and supported by a notch formed on the cam supporting plate.

8. The drum brake apparatus according to claim 1,
wherein the first cam plate is rotatably connected to the cam supporting plate by a first cam pin fitted to the cam supporting plate at the outer cam supporting position,
the second cam plate is rotatably connected to the cam supporting plate by a second cam pin fitted to the cam supporting plate at the inner cam supporting position,
each cam pin is provided with a positioning shaft passing through the cam supporting plate and projecting toward the root side of the anchor pin, and
the cam supporting plate loosely fitted to the anchor pin is located in the direction of the axis of the anchor pin by abutting the extremity of the positioning shaft of each cam pin against a flange projecting on the root side of the anchor pin.

9. The drum brake apparatus according to claim 8, wherein the extremity of the positioning shaft of the cam pin is formed into a substantially semi-spherical surface.

10. A drum brake apparatus comprising:
a first and a second brake shoes disposed in a drum to oppose each other; and
a cam mechanism for generating a braking force by opening the first and second brake shoes outward according to a shoe operating force generated by an operating force generator, and for controlling the braking force by utilizing a reaction force exerted from the brake shoes during a braking period,
wherein the cam mechanism includes:
a cam supporting plate, loosely and rotatable fitted on an anchor pin projecting upright on a backing plate, and having an input power receiving portion for receiving the shoe operating force at a position radially inwardly of the drum with respect to the anchor pin;
a first cam plate, rotatable connected to the cam supporting plate at an outer cam supporting position which is located radially outwardly of the drum with respect to the anchor pin, and having a first shoe receiving arcuate portion which comes into abutment with an end of one of the brake shoes; and
a second cam plate, rotatable connected to the cam supporting plate at an inner cam supporting position along a point between the anchor pin and the input power receiving portion, an having a second shoe receiving arcuate portion which comes into abutment with the end of the other brake shoe,
wherein, until a shoe clearance is eliminated, the cam supporting plate rotates about one of cam supporting positions of one of the cam plates which receives the brake power, to open the brake shoe being in abutment with the other of cam plates, and
after the shoe clearance is eliminated, the cam supporting plate rotates about the anchor pin to press the first and the second brake shoes against the drum.

11. A drum brake apparatus comprising:
a first and a second brake shoes disposed in a drum to oppose each other; and
a cam mechanism for generating a braking force by opening the first and second brake shoes outward according to a shoe operating force generated by an operating force generator, and for controlling the braking force by utilizing a reaction force exerted from the brake shoes during a braking period,
wherein the cam mechanism includes:
a cam supporting plate, loosely and rotatable fitted on an anchor pin projecting upright on a backing plate, and having an input power receiving portion for receiving the shoe operating force at a position radially inwardly of the drum with respect to the anchor pin;
a first cam plate, rotatable connected to the cam supporting plate at an outer cam supporting position which is located radially outwardly of the drum with respect to the anchor pin, and having a first shoe receiving arcuate portion which comes into abutment with an end of one of the brake shoes; and
a second cam plate, rotatably connected to the cam supporting plate at an inner cam supporting position along a point between the anchor pin and the input power receiving portion, and having a second shoe receiving arcuate portion which comes into abutment with the end of the other brake shoe, wherein the drum brake apparatus, further comprising a swinging movement limiter,
wherein distances L1 and L2 are set to L1≠L2, where L1 is a distance between the center of curvature of the first shoe receiving arcuate portion and the center of the anchor pin and L2 is a distance between the center of curvature of the second shoe receiving arcuate portion and the center of the anchor pin, and
wherein the swinging movement limiter limits the range of swinging movement of the respective cam plates, so that only one of the cam plates being smaller in distance between the center of the anchor pin and the center of curvature of the shoe receiving arcuate portion swings integrally with the cam supporting plate, and opens the brake shoes outward until the shoe clearance is eliminated.

* * * * *